RAND & BERRY.
Making Cut Nails.
No. 155.
Patented March 30, 1837.
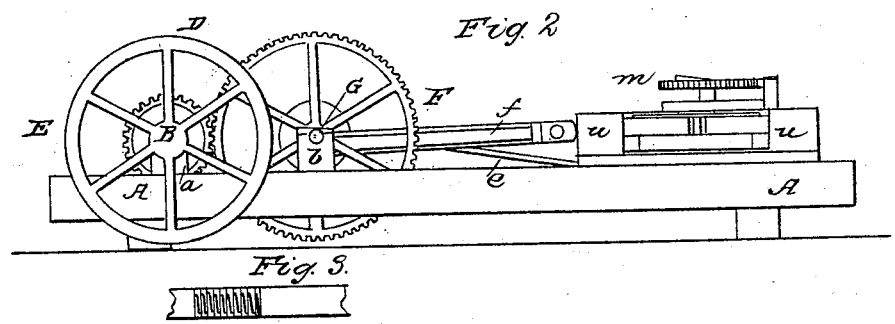
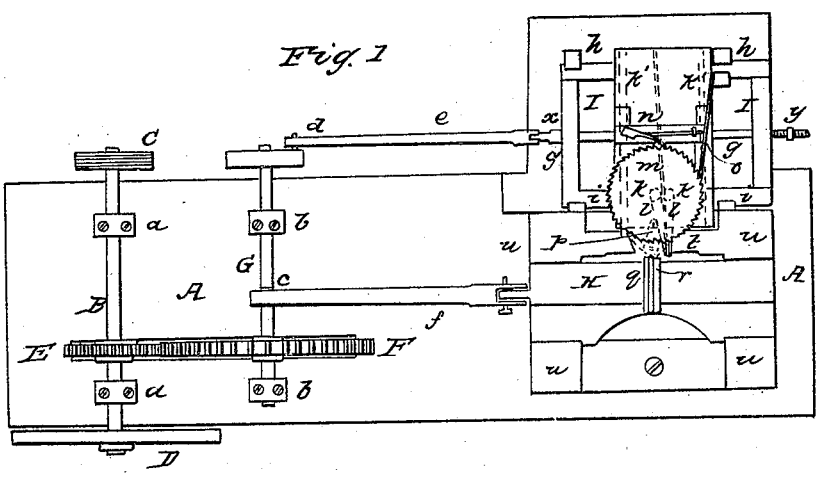

UNITED STATES PATENT OFFICE.

O. P. RAND AND JOS. BERRY, OF NEWMARKET, NEW HAMPSHIRE.

MACHINE FOR CUTTING BRADS AND NAILS.

Specification of Letters Patent No. 155, dated March 30, 1837.

*To all whom it may concern:*

Be it known that we, OLIVER P. RAND, blacksmith, and JOSEPH BERRY, carpenter, of Newmarket, in the county of Rockingham and State of New Hampshire, have invented, constructed, made and applied to use a new and useful improvement of machinery for cutting brads and nails of such various descriptions as may be manufactured by the said machinery.

The said improvement, the principle thereof, and mode of using the same we have described in the following words and drawings annexed, which, taken in combination, form our specification.

The main framework A, A, A, is composed of timbers of such strength and dimensions, or of cast or wrought iron, or other metal, as may be sufficient, for the purpose of attaching thereto the different parts or movements. B is a horizontal shaft, supported in suitable boxes or bearings $a, a$, and having on one extremity the driving pulley C, and on its opposite the fly wheel D, for regulating the motion, and causing the parts of the machine to perform more perfectly the objects for which the same are intended. On some convenient part of the horizontal shaft B is attached a cogged pinion E, the teeth of which, operating on the teeth of a cogged wheel F, on another horizontal shaft G, give a rotary motion to the said shaft G.

The shaft G is supported in suitable bearings $b, b$, and has attached to any convenient parts two cranks $c, d$, situated in regard to each other as seen in the drawings. From each of these cranks proceed connecting rods $e, f$, to the cutting and feeding frames H, I. The opposite extremity of the connecting rod $e$ is attached by a proper joint to one end of a cylindrical rod $g$.

The feeding frame I, formed of wood, iron or other suitable material, is supported and allowed to move alternately back and forth in grooves or guides $h, h, i, i$. On the upper surface of the frame I are guide rails $k', k'$, which enter into the grooves in the underside of the feeding frame, similar to the connection between the puppets and bars of the common turning lathe. The feeding frame is conveniently formed for supporting the necessary machinery connected to it consisting of a pair of feed rollers $k, k$, and two upright lips or pieces of wood or metal $l, l$, between which the strip of iron to be cut is inserted as seen in the drawing. The feed rollers are turned a suitable distance by the ratchet wheel $m$, operated on by the spring pawls $n, o$, during the motion of the feeding frame. During the movement of the frame I back and forth, the feeding frame has a similar opposite motion, or in a direction at right angles to the direction of the movement of the frame I. This is produced by a crank or short bar $p$, vibrating at one extremity on a pin in the framework of the machine, and being similarly affixed at the opposite end to the feeding frame.

The cutting frame H has suitable fixtures for holding the cutters $q, r$, in such positions to, and distance from the shoulder irons $s, t$, as may be necessary for the proper operations of cutting the brads. The cutting frame rests and moves back and forth in supports or guides $u, u, u$, attached to the main frame A.

On examination it will be perceived that every time the strip of iron between the feed rolls is presented to the action of either of the cutters $q, r$, it should remain at rest against one of the shoulders $s, t$, a period of time to permit the cutting iron to pass a sufficient distance by, to separate the brad from the strip. This is effected by the peculiar construction and operation of the rod $g$, attached to the connecting rod $e$. Near one extremity is a shoulder $x$, and on the other end an adjusting screw, on which is a nut $y$. The rod $g$, moving freely and longitudinally in its bearings, the space between the shoulder $x$ and the nut $y$ is so graduated, that during certain portions of the revolution of the crank $d$, the shoulder $x$ and nut $y$ on the rod $g$ shall not act on the feeding frame, but allow it to remain at rest a sufficient time for the brad to be severed by the cutters. This operation being effected by one of the cutters, during a half revolution of the crank $d$, the feeding frame is drawn away by the crank $p$, during its next half revolution and returned to the opposite shoulder iron, for the purpose of presenting the strip of iron to be acted on again; thus making two brads at each revolution of the crank $d$.

The cutters $q, r$, are formed so as to take the brads from the strip or plate as seen in Fig. 3.

We are aware that the size, shape and materials of the several parts of the above machinery may be varied at pleasure, so as to answer the intended purpose of cutting brads, or such other nails as may be manufactured by the same. We do not claim as our invention either of these parts separately, or for any other object; but

We claim—

A feeding and cutting apparatus, composed of such an arrangement of machinery, to operate on the strip of iron, or other metal, and sever therefrom the brads or nails, in manner as we have herein explained and described.

In testimony that the above is a true specification of our said invention and improvement, we have hereunto set our hands this twenty-first day of February, in the year of our Lord, eighteen hundred and thirty-seven.

OLIVER P. RAND.
JOSEPH BERRY.

Witnesses:
R. H. EDDY,
WILLIAM WILEY.